US012772342B2

(12) United States Patent
Luo et al.

(10) Patent No.: US 12,772,342 B2
(45) Date of Patent: Oct. 20, 2026

(54) DISPLAY DEVICE AND ELECTRONIC DEVICE

(71) Applicant: HKC Corporation Limited, Shenzhen (CN)

(72) Inventors: Fei Luo, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 735 days.

(21) Appl. No.: 18/220,988

(22) Filed: Jul. 12, 2023

(65) Prior Publication Data

US 2024/0324070 A1 Sep. 26, 2024

(30) Foreign Application Priority Data

Mar. 23, 2023 (CN) ........................ 202310287269.1

(51) Int. Cl.
*H05B 3/00* (2006.01)
*G02B 5/02* (2006.01)
*H05B 1/02* (2006.01)

(52) U.S. Cl.
CPC ......... *H05B 3/0071* (2013.01); *G02B 5/0278* (2013.01); *H05B 1/0252* (2013.01)

(58) Field of Classification Search
CPC .. H05B 3/0071; H05B 1/0252; H05B 3/0033; G02B 5/0278; F21V 33/00;
(Continued)

(56) References Cited

U.S. PATENT DOCUMENTS

2019/0212543 A1 7/2019 Li
2020/0083302 A1* 3/2020 Park .................... H10K 59/126

FOREIGN PATENT DOCUMENTS

CN 101086580 A 12/2007
CN 101779079 A 7/2010
(Continued)

OTHER PUBLICATIONS

Chinese First Office Action dated Apr. 24, 2023 issued in CN application No. 202310287269.1.
(Continued)

*Primary Examiner* — Bao Q Truong
(74) *Attorney, Agent, or Firm* — Scully, Scott, Murphy & Presser, P.C.

(57) ABSTRACT

A display device and an electronic device are provided. The display device includes a backlight module and a display panel which are stacked. The backlight module includes a back plate, at least one near-infrared light-emitting element, and at least one diffuser. The back plate includes a bottom plate and multiple side plates. The multiple side plates encircle and are connected to the bottom plate to form a receiving space. The at least one near-infrared light-emitting element is disposed in the receiving space. Each of the at least one near-infrared light-emitting element is disposed corresponding to one side plate. The near-infrared light-emitting element is inclined relative to the display panel, and configured to emit near-infrared light that can heat the skin of a user. The diffuser is disposed corresponding to a light-exiting surface of the near-infrared light-emitting element and configured to diffuse the near-infrared light emitted by the near-infrared light-emitting element.

20 Claims, 5 Drawing Sheets

(58) Field of Classification Search
CPC ............. F21V 33/0068; F21V 33/0064; F21Y 2115/00; G02F 1/133602; G02F 1/133603
See application file for complete search history.

(56) References Cited

FOREIGN PATENT DOCUMENTS

| | | | |
|---|---|---|---|
| CN | 101852362 A | | 10/2010 |
| CN | 102003641 A | | 4/2011 |
| CN | 102748656 A | | 10/2012 |
| CN | 203784737 U | | 8/2014 |
| CN | 104122702 A | | 10/2014 |
| CN | 104409592 A | | 3/2015 |
| CN | 206508402 U | | 9/2017 |
| CN | 207471284 U | | 6/2018 |
| CN | 109686244 A | | 4/2019 |
| CN | 210514884 U | | 5/2020 |
| CN | 212229387 U | | 12/2020 |
| CN | 213425413 U | | 6/2021 |
| CN | 114442331 A | | 5/2022 |
| CN | 115253086 A | | 11/2022 |
| JP | 3126228 U | | 10/2006 |
| KR | 101382744 B1 | * | 4/2014 |
| KR | 101596463 B1 | | 2/2016 |

OTHER PUBLICATIONS

Jiang Zhen "Ultra-thin design of straight-down Led LCD backlight module", Digital world (Apr. 1, 2020), Retrieved from: https://xueshu.baidu.com/usercenter/paper/show?paperid=1e170490272h0ms0sd5x08u0bx413268&site=xueshu_se.

Notice of allowance dated May 10, 2023 issued in CN application No. 202310287269.1.

* cited by examiner

DISPLAY DEVICE AND ELECTRONIC DEVICE

CROSS-REFERENCE TO RELATED APPLICATIONS

This application claims priority under 35 U.S.C. § 119(a) to Chinese Patent Application No. 202310287269.1, filed Mar. 23, 2023, the entire disclosure of which is incorporated herein by reference.

TECHNICAL FIELD

This application relates to the field of display technology, and particularly to a display device and an electronic device.

BACKGROUND

With the development of photoelectric display technology and semiconductor manufacturing technology, a Thin Film Transistor-Liquid Crystal Display (TFT-LCD) has become more and more mature, and is more and more widely applied because of its advantages of light, thin, portability, etc.

However, in the related art, a display device is generally only used for image display, and how to improve functionality of the display device has become a technical problem to be solved.

SUMMARY

In a first aspect, the disclosure provides a display device. The display device includes a backlight module and a display panel which are stacked. The backlight module includes a back plate, at least one near-infrared light-emitting element, and at least one diffuser. The back plate includes a bottom plate and multiple side plates. The multiple side plates encircle and are connected to the bottom plate to form a receiving space. The at least one near-infrared light-emitting element is disposed in the receiving space. Each of the at least one near-infrared light-emitting element is disposed corresponding to one of the multiple side plates. The near-infrared light-emitting element is inclined relative to the display panel. The near-infrared light-emitting element is configured to emit near-infrared light, where the near-infrared light can heat the skin of a user. The diffuser is disposed corresponding to a light-exiting surface of the near-infrared light-emitting element and configured to diffuse the near-infrared light emitted by the near-infrared light-emitting element.

In a second aspect, the disclosure provides an electronic device. The electronic device includes a display device and a power-supply device. The display device includes a backlight module and a display panel which are stacked. The backlight module includes a back plate, at least one near-infrared light-emitting element, and at least one diffuser. The back plate includes a bottom plate and multiple side plates. The multiple side plates encircle and are connected to the bottom plate to form a receiving space. The at least one near-infrared light-emitting element is disposed in the receiving space. Each of the at least one near-infrared light-emitting element is disposed corresponding to one of the multiple side plates. The near-infrared light-emitting element is inclined relative to the display panel. The near-infrared light-emitting element is configured to emit near-infrared light, where the near-infrared light can heat the skin of a user. The diffuser is disposed corresponding to a light-exiting surface of the near-infrared light-emitting element and configured to diffuse the near-infrared light emitted by the near-infrared light-emitting element. The power-supply device is electrically connected to the display device, and configured to provide power for the display device.

BRIEF DESCRIPTION OF THE DRAWINGS

In order to describe technical solutions of implementations of the disclosure more clearly, the following will give a brief description of accompanying drawings used for describing the implementations. Apparently, accompanying drawings described below are merely some implementations of the disclosure. Those of ordinary skill in the art can also obtain other accompanying drawings based on the accompanying drawings described below without creative efforts.

DETAILED DESCRIPTION

Figure 1:
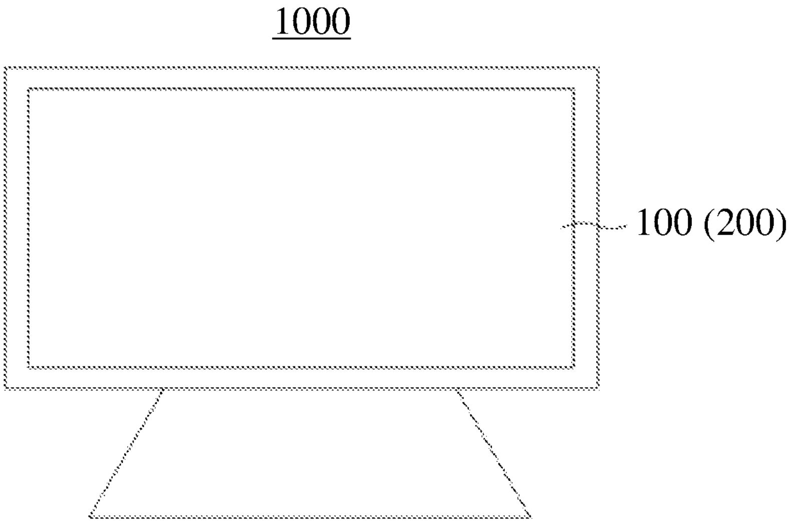
FIG. 1 is a schematic structural diagram illustrating an electronic device provided in implementation 1 of the disclosure.

Hereinafter, technical solutions of implementations of the disclosure will be depicted clearly and completely with reference to accompanying drawings in the implementations. Apparently, implementations described below are merely some implementations, rather than all implementations of the disclosure. All other implementations obtained by those of ordinary skill in the art based on the implementations without creative efforts shall fall within the protection scope of the disclosure.

The terms "embodiment" or "implementation" referred to herein mean that particular features, structures, or properties described in conjunction with the implementations may be defined in at least one implementation of the disclosure. The phrase "implementation" appearing in various places in the specification does not necessarily refer to the same implementation or an independent/alternative implementation that is mutually exclusive with other implementations. Those skilled in the art will understand expressly and implicitly that an implementation described herein may be combined with other implementations.

It is to be noted that, the terms "first", "second", and the like used in the specification, the claims, and the accompany drawings of the disclosure are used to distinguish different objects rather than describe a particular order. In addition, the terms "include", "comprise", "have", and variations thereof are intended to cover non-exclusive inclusion.

In the specification, for convenience, the phrases indicating orientation or positional relationships, such as "middle", "up", "down", "front", "rear". "vertical", "horizontal", "top", "bottom", "inner", "outer", etc., refer to positional relationships of constituent elements with reference to the accompanying drawings, and are only for the convenience of depicting the specification and simplifying the depicting, rather than explicitly or implicitly indicate that the device or component referred to herein must have a specific orientation, or must be constructed and operated in a specific orientation, and thus cannot be understood as a limitation of the disclosure. The positional relationships of the constituent elements may be appropriately changed according to the direction of the described constituent elements. Therefore, the phrases in the specification are not limited, which can be appropriately replaced according to the situation.

In the specification, unless the context clearly indicates otherwise, the terms "mounted", "coupled", and "connected" should be broadly understood. For example, these terms may refer to a fixed connection, a removable connection, or an integrated connection; or, these terms may refer to a mechanical connection or an electrical connection; or, these terms may refer to a direct connection, an indirect connection via an intermediary, or an internal communication or interaction of two elements. For those skilled in the art, the meanings of the above terms referred to herein may be understood based on specific situations.

With the development of photoelectric display technology and semiconductor manufacturing technology, a Thin Film Transistor-Liquid Crystal Display (TFT-LCD) has become more and more mature, and is more and more widely applied because of its advantages of light, thin, portability, etc.

However, in the related art, with the long-term development of LCD technology, there is little technical difference among various types of display devices, and display devices are generally only used for image display. However, differentiated performance can make products more competitive, and therefore, how to improve functionality of the display device has become a technical problem to be solved.

The disclosure provides a display device and an electronic device, to solve a technical problem of poor functionality of the display device.

In a first aspect, the disclosure provides a display device. The display device includes a backlight module and a display panel which are stacked. The backlight module includes a back plate, at least one near-infrared light-emitting element, and at least one diffuser. The back plate includes a bottom plate and multiple side plates. The multiple side plates encircle and are connected to the bottom plate to form a receiving space. The at least one near-infrared light-emitting element is disposed in the receiving space. Each of the at least one near-infrared light-emitting element is disposed corresponding to one of the multiple side plates. The near-infrared light-emitting element is inclined relative to the display panel. The near-infrared light-emitting element is configured to emit near-infrared light, where the near-infrared light can heat the skin of a user. The diffuser is disposed corresponding to a light-exiting surface of the near-infrared light-emitting element and configured to diffuse the near-infrared light emitted by the near-infrared light-emitting element.

In the display device of the disclosure, the multiple side plates of the back plate surround and are connected to the bottom plate to form the receiving space. The near-infrared light-emitting element is disposed in the receiving space and inclined relative to the display panel, and is configured to emit near-infrared light that can heat the skin of the user. The diffuser is disposed corresponding to the light-exiting surface of the near-infrared light-emitting element. Currently, people's awareness of skin health is increasing, but many people sit in the office for a long time and don't have enough time to pamper skin care. The near-infrared light emitted by the near-infrared light-emitting element in the display device of the disclosure can heat the skin of the user, which can promote proliferation of deep collagen under the skin of the user, increase blood circulation, and promote melanin decomposition, and thus, the display device of the disclosure has an excellent cosmetic function, allowing the user to perform skin care while working.

Furthermore, the near-infrared light-emitting element is inclined relative to the display panel, so that near-infrared light emitted by the near-infrared light-emitting element can be emitted to the display panel, thereby reducing loss of the near-infrared light, utilizing the near-infrared light more efficiently, and enabling the near-infrared light to act on the skin of the user. The diffuser can expand an exiting range of the near-infrared light, so that near-infrared light emitted by a near-infrared light-emitting unit can cover the display panel more completely, thereby increasing a utilization rate of the near-infrared light.

In some implementations, the near-infrared light-emitting element includes a lamp plate and multiple near-infrared light lamp beads disposed on the lamp plate. The diffuser is a convex diffusion lens, where the convex diffusion lens is connected to the lamp plate, covers the near-infrared light lamp beads, and protrudes towards the display panel.

In some implementations, the backlight module further includes an optical film layer. The optical film layer is disposed on the side plate and disposed between the near-infrared light-emitting element and the display panel. The optical film layer is configured to homogenize the near-infrared light emitted by the near-infrared light-emitting element.

In some implementations, the side plate has a mounting surface for mounting the near-infrared light-emitting element, and an angle a between the mounting surface and a side of the bottom plate away from the receiving space satisfies: $30° \leq a \leq 70°$.

In some implementations, the mounting surface defines a mounting groove, and the mounting groove is used for mounting the near-infrared light-emitting element.

In some implementations, the at least one near-infrared light-emitting element includes multiple near-infrared light-emitting elements, and each of the multiple near-infrared light-emitting elements is disposed corresponding to one side plate; for two near-infrared light-emitting elements disposed opposite to each other, in a direction from one of the two near-infrared light-emitting elements towards the other one of the two near-infrared light-emitting elements, multiple near-infrared light lamp beads in the one of the two near-infrared light-emitting elements and multiple near-infrared light lamp beads in the other one of the two near-infrared light-emitting elements are disposed in a staggered manner or disposed opposite to one another.

In some implementations, the multiple side plates include a first side plate, a second side plate, a third side plate, and a fourth side plate which are sequentially connected in a bent manner. The first side plate has a length equal to the third side plate, and the first side plate is opposite to and spaced apart from the third side plate. The second side plate has a length equal to the fourth side plate, and the second side plate is opposite to and spaced apart from the fourth side plate. The first side plate and the third side plate each have a length greater than the second side plate and the fourth side plate. Multiple near-infrared light lamp beads on the first side plate and multiple near-infrared light lamp beads on the third side plate are disposed in a staggered manner. Multiple near-infrared light lamp beads on the second side plate are disposed opposite to multiple near-infrared light lamp beads on the fourth side plate.

In some implementations, the display device further includes at least one distance detector. The at least one distance detector is configured to detect an actual distance between the user and the display device. The display device further includes a controller. The controller is electrically connected to the distance detector and the near-infrared light-emitting element, and configured to control the near-infrared light-emitting element to emit near-infrared light when the controller determines that the actual distance is less than a maximum of a preset range.

In some implementations, the multiple side plates include a first side plate and a second side plate which are disposed opposite to each other, and the at least one near-infrared light-emitting element includes a first light-emitting element disposed on the first side plate and a second light-emitting element disposed on the second side plate. Near-infrared light emitted by the first light-emitting element intersects with near-infrared light emitted by the second light-emitting element to form an effective working region. The controller is configured to control the near-infrared light-emitting element to emit near-infrared light when the controller determines that the user is located in the effective working region.

In some implementations, the near-infrared light has a wavelength of 900 nm to 1800 nm.

In a second aspect, the disclosure provides an electronic device. The electronic device includes a display device and a power-supply device. The display device includes a backlight module and a display panel which are stacked. The backlight module includes a back plate, at least one near-infrared light-emitting element, and at least one diffuser. The back plate includes a bottom plate and multiple side plates. The multiple side plates encircle and are connected to the bottom plate to form a receiving space. The at least one near-infrared light-emitting element is disposed in the receiving space. Each of the at least one near-infrared light-emitting element is disposed corresponding to one of the multiple side plates. The near-infrared light-emitting element is inclined relative to the display panel. The near-infrared light-emitting element is configured to emit near-infrared light, where the near-infrared light can heat the skin of a user. The diffuser is disposed corresponding to a light-exiting surface of the near-infrared light-emitting element and configured to diffuse the near-infrared light emitted by the near-infrared light-emitting element. The power-supply device is electrically connected to the display device, and configured to provide power for the display device.

Referring to FIG. 1, FIG. 1 is a schematic structural diagram illustrating an electronic device provided in implementation 1 of the disclosure. The disclosure provides a display device 100 and an electronic device 1000, to solve the technical problem of poor functionality of the display device. The display device 100 can be applied to the electronic device 1000.

The electronic device 1000 may be, but is not limited to, a mobile phone, a tablet computer, a notebook computer, a handheld computer, a Personal Computer (PC), a Personal Digital Assistant (PDA), a Portable Media Player (PMP), an unmanned vehicle, a robot cleaner, an earphone, a camera, etc.

As illustrated in FIG. 1, the electronic device 1000 includes the display device 100 and a power-supply device 200. The power-supply device 200 is electrically connected to the display device 100 and configured to provide power for the display device 100.

Figure 2:
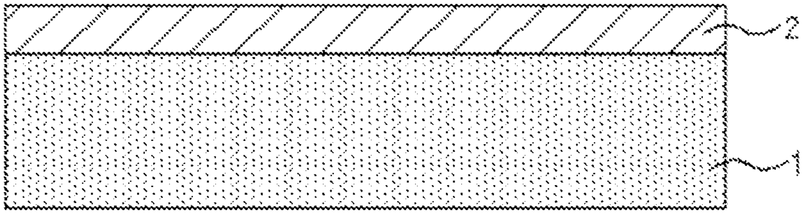
FIG. 2 is a schematic diagram illustrating an overall structure of a display device provided in implementation 1 of the disclosure.
Figure 3A:
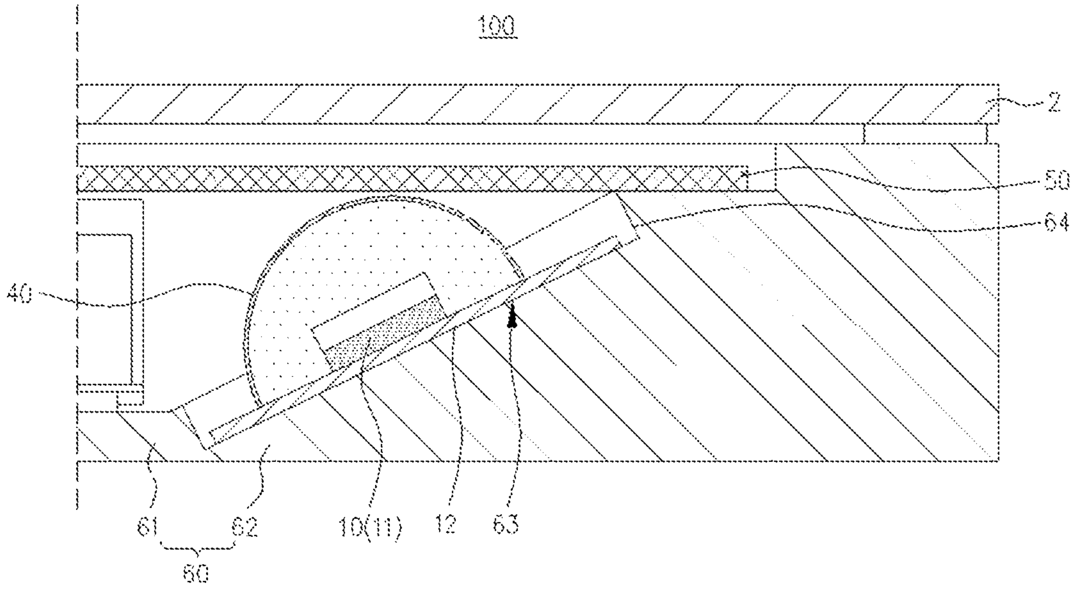
FIG. 3A is a first schematic diagram illustrating a cross-sectional structure of a display device provided in implementation 1 of the disclosure.
Figure 3B:
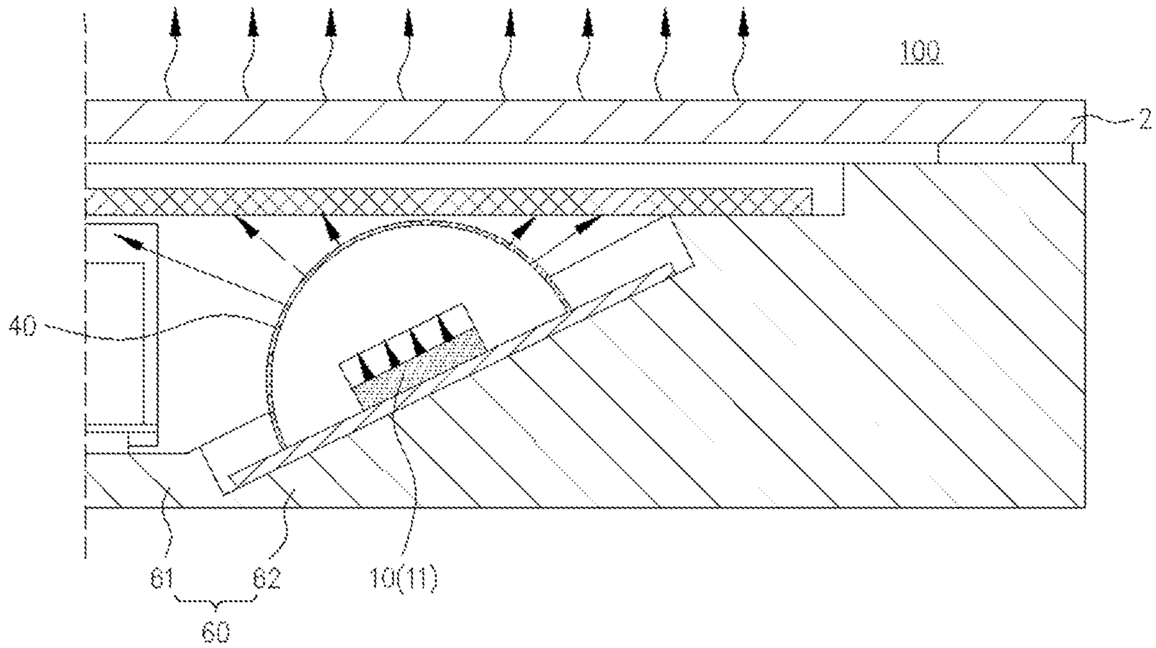
FIG. 3B is a schematic diagram illustrating a light path of near-infrared light of a display device provided in implementation 1 of the disclosure.

Referring to FIG. 2, FIG. 3A, and FIG. 3B, FIG. 2 is a schematic diagram illustrating an overall structure of a display device provided in implementation 1 of the disclosure, FIG. 3A is a first schematic diagram illustrating a cross-sectional structure of a display device provided in implementation 1 of the disclosure, and FIG. 3B is a schematic diagram illustrating a light path of near-infrared light of a display device provided in implementation 1 of the disclosure.

The display device 100 includes a display panel 2 and a backlight module 1 which are stacked. The backlight module 1 is configured to provide light for the display panel 2, and the display panel 2 is configured to allow the light from the backlight module 1 to pass through and form a display image, to display image information required by a user.

The backlight module 1 includes a back plate 60, at least one near-infrared light-emitting element 10, and at least one diffuser 40. The back plate 60 includes a bottom plate 61 and multiple side plates 62, and the multiple side plates 62 encircle and are connected to the bottom plate 61 to form a receiving space. The near-infrared light-emitting element 10 is disposed in the receiving space, each of the at least one near-infrared light-emitting element 10 is disposed corresponding to one of the multiple side plates 62, the near-infrared light-emitting element 10 is inclined relative to the display panel 2, and the near-infrared light-emitting element 10 is configured to emit near-infrared light, where the near-infrared light can heat the skin of a user. The diffuser 40 is disposed corresponding to a light-exiting surface of the near-infrared light-emitting element 10, and is configured to diffuse near-infrared light emitted by the near-infrared light-emitting element.

The backlight module 1 includes the back plate 60, the back plate 60 includes the bottom plate 61 and the multiple side plates 62, and the multiple side plates 62 surround and are connected to the bottom plate 61 to form the receiving space. The multiple side plates 62 are also used to support and fix the display panel 2. Optionally, the back plate 60 may be made of plastic, metal, or other materials.

The near-infrared light-emitting element 10 is configured to emit near-infrared light that can heat the skin of the user. The thermal effect of the near-infrared light can not only promote proliferation of collagen under human skin, but also increase blood circulation and promote melanin decomposition.

The near-infrared light is an electromagnetic wave having a specific wavelength. Optionally, a wavelength of the near-infrared light in the disclosure ranges from 900 nm to 1800 nm. For example, the wavelength of the near-infrared light may be 900 nm, 950 nm, 1000 nm, 1200 nm, 1500 nm, 1530 nm, 1780 nm, 1800 nm, or other values within the range of 900 nm to 1800 nm, which is not limited in the disclosure. If the wavelength of the near-infrared light is less than 900 nm, the thermal effect of the near-infrared light on human skin will be greatly reduced. Since the near-infrared light is emitted by the near-infrared light-emitting element 10 and is limited by the power of the near-infrared light-emitting element 10, the wavelength of the near-infrared light emitted by the near-infrared light-emitting element 10 is generally less than 1800 nm.

Specifically, an electromagnetic wave in a waveband of 900 nm to 1800 nm can penetrate epidermis of a human body, directly heat water molecules under the epidermis, and empower damaged cells of the human body by means of a thermal action, to promot repair and regeneration of deep collagen, accelerate blood circulation, and discharge pigment deposit and skin metabolic wastes. Moreover, a surface layer of the skin of the human body can generally withstand a safety temperature of 40° C. to 43° C., and there is a risk of burn once the safety temperature is exceeded. Infrared light can quickly heat the skin of the user to 43° C. in 20 seconds, and can keep a constant temperature in a large area, thereby improving skin condition of the user.

The near-infrared light-emitting element 10 is inclined relative to the display panel 2, in other words, a light-exiting surface of the near-infrared light-emitting element 10 faces the display panel 2, so that near-infrared light emitted by the near-infrared light-emitting element 10 can be emitted to the display panel 2 and then reach the skin of the user after exiting from the display panel 2, which can reduce loss of the near-infrared light, utilize the near-infrared light more efficiently, and enable the near-infrared light to act on the skin of the user.

The backlight module 1 further includes at least one diffuser 40. The diffuser 40 is disposed corresponding to a light-exiting surface of the near-infrared light-emitting element 10, and configured to diffuse the near-infrared light emitted by the near-infrared light-emitting element. The diffuser 40 can enlarge an exiting range of the near-infrared light, so that near-infrared light emitted by a near-infrared light-emitting unit can cover the display panel 2 more completely, thereby increasing a utilization rate of the near-infrared light.

In the display device 100 of the disclosure, the multiple side plates 62 of the back plate 60 surround and are connected to the bottom plate 61 to form the receiving space. The near-infrared light-emitting element 10 is disposed in the receiving space and inclined relative to the display panel 2, and is configured to emit near-infrared light that can heat the skin of the user. The diffuser 40 is disposed corresponding to the light-exiting surface of the near-infrared light-emitting element 10. Currently, people's awareness of skin health is increasing, but many people sit in the office for a long time and don't have enough time to pamper skin care. The near-infrared light emitted by the near-infrared light-emitting element 10 in the display device 100 of the disclosure can heat the skin of the user, which can promote proliferation of deep collagen under the skin of the user, increase blood circulation, and promote melanin decomposition, and thus, the display device 100 has an excellent cosmetic function, allowing the user to perform skin care while working.

Furthermore, the near-infrared light-emitting element 10 is inclined relative to the display panel 2, so that near-infrared light emitted by the near-infrared light-emitting element 10 can be emitted to the display panel 2, thereby reducing loss of the near-infrared light, utilizing the near-infrared light more efficiently, and enabling the near-infrared light to act on the skin of the user. The diffuser 40 can expand the exiting range of the near-infrared light, so that near-infrared light emitted by a near-infrared light-emitting unit can cover the display panel 2 more completely, thereby increasing a utilization rate of the near-infrared light.

Figure 4:
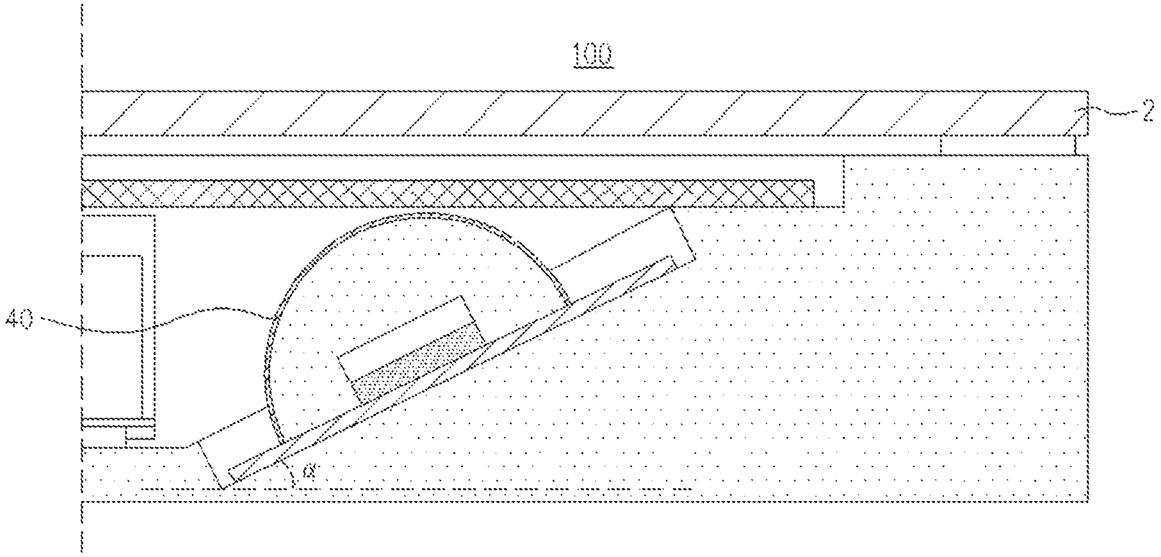
FIG. 4 is a second schematic diagram illustrating a cross-sectional structure of a display device provided in implementation 1 of the disclosure.

Referring to FIG. 3A and FIG. 4, FIG. 4 is a second schematic diagram illustrating a cross-sectional structure of a display device provided in implementation 1 of the disclosure. The side plate 62 has a mounting surface 63 for mounting the near-infrared light-emitting element 10. An angle a between the mounting surface 63 and a side of the bottom plate 61 away from the receiving space satisfies: 30°≤a≤70°.

Specifically, if the angle a between the mounting surface 63 and the side of the bottom plate 61 away from the receiving space is less than 30°, part of the near-infrared light emitted by the near-infrared light-emitting element 10 may irradiate a non-display region of the display panel 2, and the near-infrared light irradiating the non-display region cannot pass through the display panel 2 and cannot heat the skin of the user, as a result, the utilization rate of the near-infrared light is reduced. If the angle a between the mounting surface 63 and the side of the bottom plate 61 away from the receiving space is greater than 70°, part of the near-infrared light emitted by the near-infrared light-emitting element 10 may irradiate an inner side surface of the display device 100, and the near-infrared light irradiating the inner side surface of the display device 100 cannot pass through the display panel 2 and cannot heat the skin of the user, as a result, the utilization rate of the near-infrared light is reduced.

Therefore, when the angle a between the side of the bottom plate 61 away from the receiving space and the mounting surface 63 satisfies 30°≤a≤70°, more near-infrared light can irradiate a display region of the display panel 2 and act on the skin of the user, thereby further increasing the utilization rate of the near-infrared light.

For example, the angle a between the mounting surface 63 and the side of the bottom plate 61 away from the receiving space is 30°, 35°, 40°, 41°, 43°, 47°, 52°, 56°, 60°, 69°, 70°, or other values within 30°≤a≤70°.

Referring to FIG. 3A again, the mounting surface 63 has a mounting groove 64. The mounting groove 64 is used for mounting the near-infrared light-emitting element 10.

In this implementation, a lamp plate is adhered to bottom of the mounting groove 64.

Referring to FIG. 3A again, the near-infrared light-emitting element 10 includes a lamp plate 12 and multiple near-infrared light lamp beads 11 disposed on the lamp plate 12.

In this implementation, the diffuser 40 is a convex diffusion lens, and a convex direction of the convex diffusion lens is towards the display panel 2. In other implementations, the diffuser 40 may also be other structures, which is not limited in the disclosure.

In this implementation, the convex diffusion lens is connected to the lamp plate 12, and covers the near-infrared light lamp beads 11.

The convex diffusion lens is connected to the lamp plate 12 and covers the near-infrared light lamp beads 11, which can prevent near-infrared light emitted by the near-infrared light lamp bead 11 from being emitted to other parts, thereby increasing the utilization rate of the near-infrared light.

Referring to FIG. 3A again, the backlight module 1 further includes an optical film layer 50. The optical film layer 50 is disposed on the side plate 62 and disposed between the near-infrared light-emitting element 10 and the display panel 2. The optical film layer 50 is configured to homogenize the near-infrared light emitted by the near-infrared light-emitting element 10.

The optical film layer 50 is used to homogenize the near-infrared light, and further used to guide the near-infrared light to one side of the display panel 2.

The optical film layer 50 includes components that can change the direction of the near-infrared light, such as a diffusion sheet, a brightening sheet, and a light uniformizing sheet.

The optical film layer 50 is configured to homogenize the near-infrared light to emit the homogenized light to the display panel 2, to increase the exiting range of the near-infrared light in the display device 100, thereby increasing an effective cosmetic region of the display device 100.

The display device 100 includes multiple near-infrared light-emitting elements 10, and each of the multiple near-infrared light-emitting elements 10 is disposed corresponding to one side plate 62. For two near-infrared light-emitting elements 10 disposed opposite to each other, in a direction from one of the two near-infrared light-emitting elements 10 towards the other one of the two near-infrared light-emitting elements 10, multiple near-infrared light lamp beads 11 in the one of the two near-infrared light-emitting elements 10 and multiple near-infrared light lamp beads 11 in the other one of the two near-infrared light-emitting elements 10 are disposed in a staggered manner or disposed opposite to one another.

Figure 5:
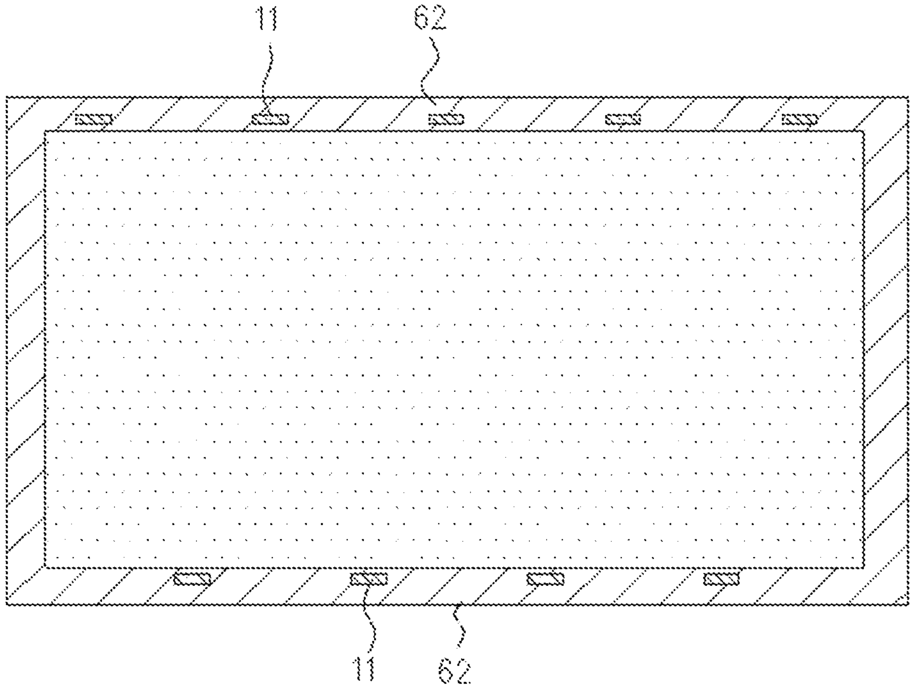
FIG. 5 is a schematic structural diagram illustrating a display device with multiple near-infrared light lamp beads provided in implementation 2 of the disclosure.

Referring to FIG. 3A and FIG. 5, FIG. 5 is a schematic structural diagram illustrating a display device with multiple near-infrared light lamp beads provided in implementation 2 of the disclosure. In an implementation, multiple near-infrared light lamp beads 11 of two near-infrared light-emitting elements 10 on two side plates 62 (where the two side plates 62 are disposed opposite to each other) are disposed in a staggered manner, to reduce an overlapping area of near-infrared light (emitted by the multiple near-infrared light lamp beads 11) on the display panel 2. As such, it is possible to provide a smaller number of near-infrared light lamp beads 11 while ensuring that the near-infrared light covers the whole display panel 2, thereby reducing the cost.

It is to be noted that, the expression "multiple near-infrared light lamp beads 11 in the one of the two near-infrared light-emitting elements 10 and multiple near-infrared light lamp beads 11 in the other one of the two near-infrared light-emitting elements 10 are disposed in a staggered manner" means that, for two near-infrared light-emitting elements 10 disposed at opposite positions, in a direction from said one near-infrared light-emitting element 10 towards the other near-infrared light-emitting element 10, an orthographic projection of the near-infrared light lamp bead 11 in said one near-infrared light-emitting element 10 on the other near-infrared light-emitting element 10 falls between adjacent near-infrared light lamp beads 11 in the other near-infrared light-emitting element 10. For ease of understanding, the above the two near-infrared light-emitting elements 10, for example, are a first light-emitting element and a second light-emitting element. The expression "multiple near-infrared light lamp beads 11 in the one of the two near-infrared light-emitting elements 10 and multiple near-infrared light lamp beads 11 in the other one of the two near-infrared light-emitting elements 10 are disposed in a staggered manner" means that, for the first light-emitting element and the second light-emitting element disposed at opposite positions, in a direction from the first light-emitting element towards the second light-emitting element, an orthographic projection of the near-infrared light lamp bead 11 in the first light-emitting element on the second light-emitting element falls between adjacent near-infrared light lamp beads 11 in the second light-emitting element.

Figure 6:
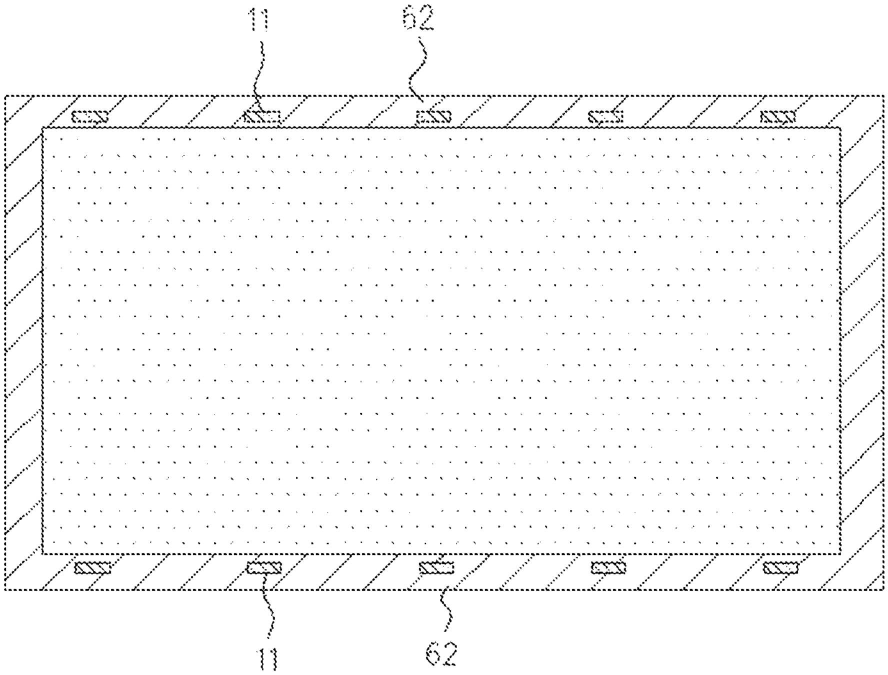
FIG. 6 is a schematic structural diagram illustrating a display device with multiple near-infrared light lamp beads provided in implementation 3 of the disclosure.

Referring to FIG. 3A and FIG. 6, FIG. 6 is a schematic structural diagram illustrating a display device with multiple near-infrared light lamp beads provided in implementation 3 of the disclosure. In another implementation, multiple near-infrared light lamp beads 11 of two near-infrared light-emitting elements 10 on two side plates 62 (where the two side plates 62 are disposed opposite to each other) are disposed opposite to each other, to increase the overlapping area of near-infrared light on the display panel 2, thereby increasing the irradiation amount of the near-infrared light on the display panel 2, and improving the cosmetic effect of the display device 100 generated by heating the skin of the user.

It is to be noted that, the expression "multiple near-infrared light lamp beads 11 in the one of the two near-infrared light-emitting elements 10 and multiple near-infrared light lamp beads 11 in the other one of the two near-infrared light-emitting elements 10 are disposed opposite to each other" means that, for two near-infrared light-emitting elements 10 disposed at opposite positions, in a direction from said one near-infrared light-emitting element 10 towards the other near-infrared light-emitting element 10, an orthographic projection of the near-infrared light lamp bead 11 in said one near-infrared light-emitting element 10 on the other near-infrared light-emitting element 10 falls on a corresponding near-infrared light lamp bead 11 in the other near-infrared light-emitting element 10. For ease of understanding, the above the two near-infrared light-emitting elements 10, for example, are a first light-emitting element and a second light-emitting element. The expression "multiple near-infrared light lamp beads 11 in the one of the two near-infrared light-emitting elements 10 and multiple near-infrared light lamp beads 11 in the other one of the two near-infrared light-emitting elements 10 are disposed opposite to each other" means that, for the first light-emitting element and the second light-emitting element disposed at opposite positions, in a direction from the first light-emitting element towards the second light-emitting element, an orthographic projection of the near-infrared light lamp bead 11 in the first light-emitting element on the second light-emitting element falls on a corresponding near-infrared light lamp bead 11 in the second light-emitting element.

Figure 7:
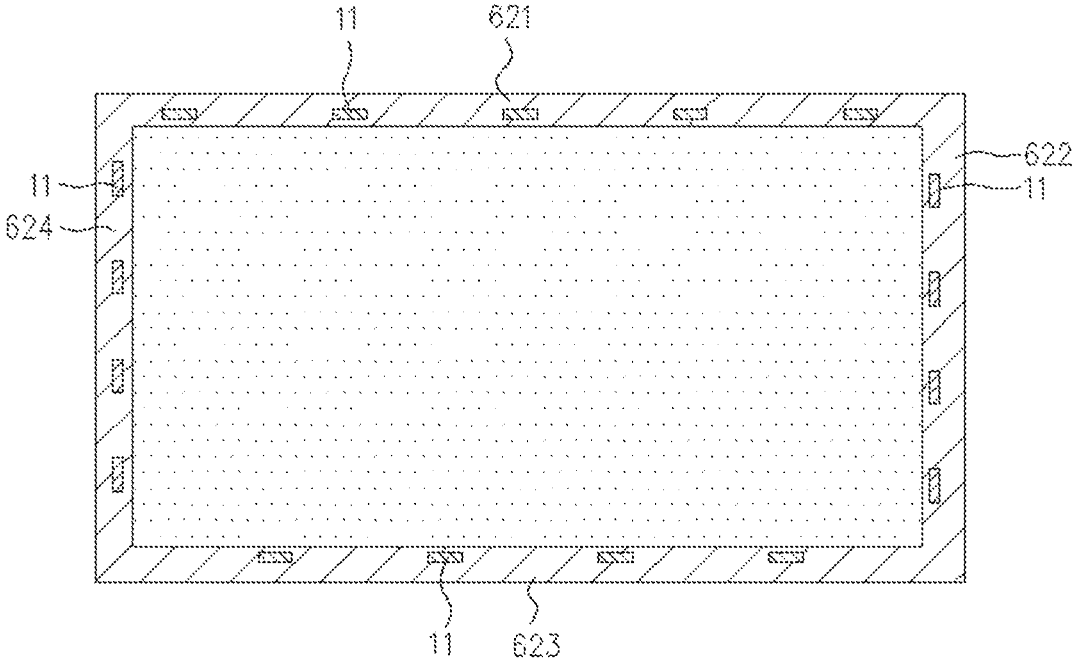
FIG. 7 is a schematic structural diagram illustrating a display device with multiple near-infrared light lamp beads provided in implementation 4 of the disclosure.

Referring to FIG. 3A and FIG. 7, FIG. 7 is a schematic structural diagram illustrating a display device with multiple near-infrared light lamp beads provided in implementation 4 of the disclosure. In another implementation, the multiple side plates 62 include a first side plate 621, a second side plate 622, a third side plate 623, and a fourth side plate 624 which are sequentially connected in a bent manner. A length of the first side plate 621 is equal to that of the third side plate 623, and the first side plate 621 is opposite to and spaced apart from the third side plate 623. A length of the second side plate 622 is equal to that of the fourth side plate 624, and the second side plate 622 is opposite to and spaced apart from the fourth side plate 624. The first side plate 621 and the third side plate 623 each have a length greater than the second side plate 622 or the fourth side plate 624.

Multiple near-infrared light lamp beads 11 on the first side plate 621 and multiple near-infrared light lamp beads 11 on the third side plate 623 are disposed in a staggered manner.

Multiple near-infrared light lamp beads 11 on the second side plate 622 are disposed opposite to multiple near-infrared light lamp beads 11 on the fourth side plate 624.

In this implementation, since near-infrared light emitted by near-infrared light-emitting elements 10 on the first side plate 621 and the third side plate 623 needs to be transmitted over a short distance, near-infrared light lamp beads 11 of the two near-infrared light-emitting elements 10 are disposed in a staggered manner, to reduce an overlapping area of near-infrared light (emitted by the near-infrared light lamp beads 11) on the display panel 2. As such, it is possible to provide a smaller number of near-infrared light lamp beads 11 while ensuring that the near-infrared light covers the whole display panel 2, thereby reducing the cost. Since near-infrared light emitted by near-infrared light-emitting elements 10 on the second side plate 622 and the fourth side plate 624 needs to be transmitted over a long distance, near-infrared light lamp beads 11 of the two near-infrared light-emitting elements 10 are disposed opposite to each other, to increase the overlapping area of the near-infrared light on the display panel 2, thereby increasing the irradiation amount of the near-infrared light on the display panel 2, and improving the cosmetic effect of the display device 100 generated by heating the skin of the user. As explained in the foregoing implementations, the near-infrared light lamp beads 11 are disposed in a staggered manner or disposed opposite to each other, which will not be repeated herein.

Figure 8:
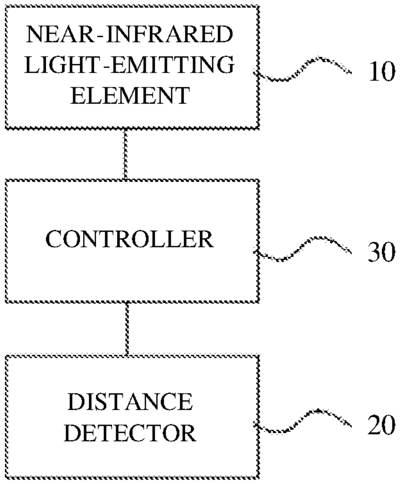
FIG. 8 is a schematic diagram illustrating connection among a near-infrared light-emitting element, a distance detector, and a controller provided in implementation 1 of the disclosure.

Referring to FIG. 3A and FIG. 8, FIG. 8 is a schematic diagram illustrating connection among a near-infrared light-emitting element, a distance detector, and a controller provided in implementation 1 of the disclosure. The display device 100 includes a controller 30. The controller 30 is electrically connected to the near-infrared light-emitting element 10 of the display device 100, and configured to control the near-infrared light-emitting element 10.

The controller 30 is electrically connected to the near-infrared light-emitting element 10 of the display device 100, and can be configured to control the near-infrared light-emitting element 10 to emit or not to emit near-infrared light.

Optionally, the position of the controller 30 is not limited in the disclosure. The controller 30 may be disposed in the backlight module 1, the display panel 2, or other devices.

The display device 100 further includes at least one distance detector 20. The distance detector 20 is configured to detect an actual distance between the user and the display device 100.

The controller 30 is electrically connected to the distance detector 20 and the near-infrared light-emitting element 10. When the controller 30 determines that the actual distance is less than a maximum of a preset range, the controller 30 is configured to control the near-infrared light-emitting element 10 to emit near-infrared light.

The display device 100 further includes the distance detector 20. The distance detector 20 can be configured to detect the actual distance between the user and the display device 100. Optionally, the distance detector 20 includes, but is not limited to, a motion sensor, an ultrasonic distance detector, a laser distance detector, or other types of distance detectors.

The controller 30 is electrically connected to the distance detector 20 and the near-infrared light-emitting element 10, and the controller 30 can control operation of the near-infrared light-emitting element 10 according to the actual distance between the user and the display device 100. Specifically, the controller 30 controls whether the near-infrared light-emitting element 10 operates by determining whether the actual distance is within the preset range. For example, if the controller 30 determines that the actual distance is within the preset range, it means that the user is located in an effective irradiation range of the near-infrared light-emitting element 10, and thus, the controller 30 controls the near-infrared light-emitting element 10 to emit near-infrared light. On the contrary, if the controller 30 determines that the actual distance is beyond the preset range, it means that near-infrared light emitted by the near-infrared light-emitting element 10 cannot act on the user, and thus, the controller 30 controls the near-infrared light-emitting element 10 to stop emitting near-infrared light.

Further, when the actual distance is within the preset range (in other words, the user is located in an effective cosmetic region of the display device 100), the distance detector 20 generates a first signal and transmits the first signal to the controller 30, and the controller 30 controls the near-infrared light-emitting element 10 to emit near-infrared light in response to the first signal. When the actual distance is beyond the preset range (in other words, the user is not located in the effective cosmetic region of the display device 100), the distance detector 20 generates a second signal and transmits the second signal to the controller 30, and the controller 30 controls the near-infrared light-emitting element 10 to stop emitting near-infrared light in response to the second signal.

Optionally, the position of the distance detector 20 is not limited in the disclosure. The distance detector 20 may be disposed in the backlight module 1, the display panel 2, or other devices.

In the display device 100 of the disclosure includes the near-infrared light-emitting element 10, the distance detector 20, and the controller 30, the distance detector 20 is configured to detect the actual distance between the display device 100 and the user, and the controller 30 is configured to control the near-infrared light-emitting element 10 to emit near-infrared light that can heat the skin of the user when the controller 30 determines that the actual distance is within the preset range. If the actual distance between the user and the display device 100 is within the preset range, the near-infrared light-emitting element 10 operates and emits light, so that the near-infrared light emitted by the near-infrared light-emitting element 10 can act on the skin of the user to the greatest extent, thereby effectively reducing loss caused by power consumption of the display device 100.

The preset range is not limited in the disclosure, and may be adjusted according to the power of the near-infrared light-emitting element 10. In this implementation, the preset range is a range of 0 cm to 100 cm. In other implementations, the preset range may also be a range of 0 cm to 70 cm, a range of 0 cm to 80 cm, a range of 20 cm to 90 cm, or other ranges, which is not limited in the disclosure.

Figure 9:
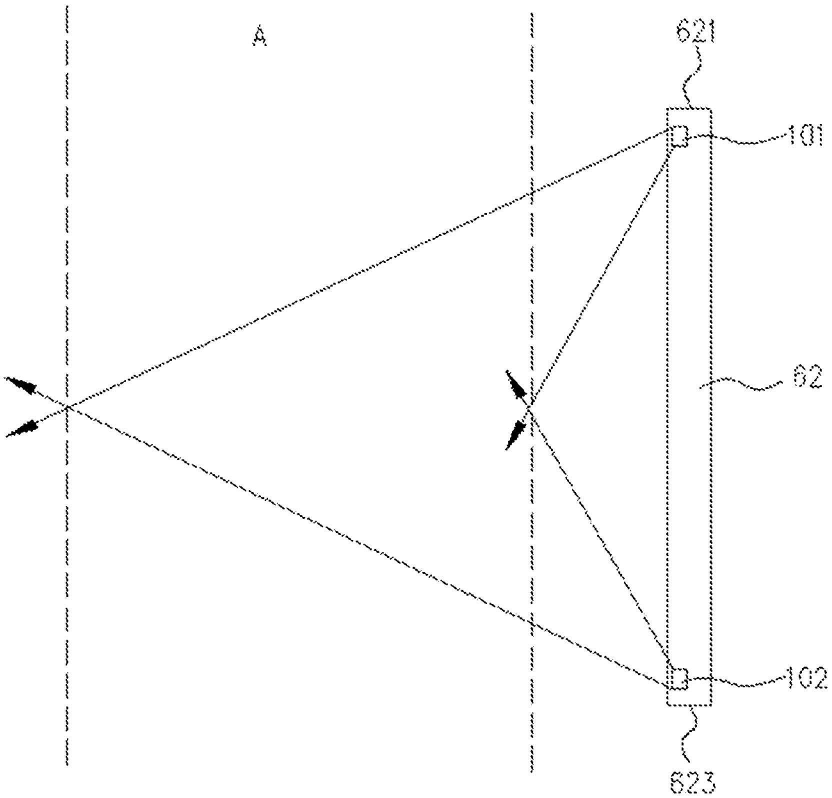
FIG. 9 is a schematic diagram illustrating an effective working region of a display device provided in implementation 1 of the disclosure.

Referring to FIG. 3A and FIG. 9, FIG. 9 is a schematic diagram illustrating an effective working region of a display device provided in implementation 1 of the disclosure. In an implementation, the multiple side plates 62 include a first side plate 621 and a third side plate 623 which are disposed opposite to each other, and the at least one near-infrared light-emitting element 10 includes a first light-emitting element 101 disposed on the first side plate 621 and a second light-emitting element 102 disposed on the third side plate 623.

Near-infrared light emitted by the first light-emitting element 101 intersects with near-infrared light emitted by the second light-emitting element 102 to form an effective working region A. When the controller 30 determines that the user is located in the effective working region A, the controller 30 controls the near-infrared light-emitting element 10 to emit near-infrared light.

In other words, the effective working region A is the above effective cosmetic region. In a direction perpendicular to the display panel 2, the length of the effective cosmetic region is the above preset range.

In other implementations, if other sides of the back plate 60 are also provided with the near-infrared light-emitting element 10, the effective working region A will also change, which is not limited in the disclosure.

The above are only some implementations of the disclosure. It is to be noted that, a person skilled in the art may make further improvements and modifications without departing from the principle of the disclosure, and these improvements and modifications shall also belong to the scope of protection of the disclosure.

What is claimed is:

1. A display device, comprising a backlight module and a display panel which are stacked, the backlight module comprising:

a back plate comprising a bottom plate and a plurality of side plates, wherein the plurality of side plates encircle and are connected to the bottom plate to form a receiving space;

at least one near-infrared light-emitting element disposed in the receiving space, wherein each of the at least one near-infrared light-emitting element is disposed corresponding to one of the plurality of side plates, the near-infrared light-emitting element is inclined relative to the display panel, and the near-infrared light-emitting element is configured to emit near-infrared light, wherein the near-infrared light can heat the skin of a user; and at least one diffuser, wherein the diffuser is disposed corresponding to a light-exiting surface of the near-infrared light-emitting element and configured to diffuse the near-infrared light emitted by the near-infrared light-emitting element.

2. The display device of claim 1, wherein the near-infrared light-emitting element comprises a lamp plate and a plurality of near-infrared light lamp beads disposed on the lamp plate; and the diffuser is a convex diffusion lens, wherein the convex diffusion lens is connected to the lamp plate, covers the near-infrared light lamp beads, and protrudes towards the display panel.

3. The display device of claim 1, wherein the backlight module further comprises an optical film layer, wherein the optical film layer is disposed on the side plate and disposed between the near-infrared light-emitting element and the display panel, and the optical film layer is configured to homogenize the near-infrared light emitted by the near-infrared light-emitting element.

4. The display device of claim 1, wherein the side plate has a mounting surface for mounting the near-infrared light-emitting element, and an angle a between the mounting surface and a side of the bottom plate away from the receiving space satisfies: $30° \leq a \leq 70°$.

5. The display device of claim 4, wherein the mounting surface defines a mounting groove, and the mounting groove is used for mounting the near-infrared light-emitting element.

6. The display device of claim 2, wherein the at least one near-infrared light-emitting element comprises a plurality of near-infrared light-emitting elements, and each of the plurality of near-infrared light-emitting elements is disposed corresponding to one side plate; for two near-infrared light-emitting elements disposed opposite to each other, in a direction from one of the two near-infrared light-emitting elements towards the other one of the two near-infrared light-emitting elements, a plurality of near-infrared light lamp beads in the one of the two near-infrared light-emitting elements and a plurality of near-infrared light lamp beads in the other one of the two near-infrared light-emitting elements are disposed in a staggered manner or disposed opposite to one another.

7. The display device of claim 6, wherein the plurality of side plates comprise a first side plate, a second side plate, a third side plate, and a fourth side plate which are sequentially connected in a bent manner, wherein the first side plate has a length equal to the third side plate, and the first side plate is opposite to and spaced apart from the third side plate; the second side plate has a length equal to the fourth side plate, and the second side plate is opposite to and spaced apart from the fourth side plate; the first side plate and the third side plate each have a length greater than the second side plate and the fourth side plate;

a plurality of near-infrared light lamp beads on the first side plate and a plurality of near-infrared light lamp beads on the third side plate are disposed in a staggered manner; and a plurality of near-infrared light lamp beads on the second side plate are disposed opposite to a plurality of near-infrared light lamp beads on the fourth side plate.

8. The display device of claim 1, further comprising:

at least one distance detector configured to detect an actual distance between the user and the display device; and a controller electrically connected to the distance detector and the near-infrared light-emitting element, and configured to control the near-infrared light-emitting element to emit near-infrared light when the controller determines that the actual distance is less than a maximum of a preset range.

9. The display device of claim 8, wherein the plurality of side plates comprise a first side plate and a second side plate which are disposed opposite to each other, and the at least one near-infrared light-emitting element comprises a first light-emitting element disposed on the first side plate and a second light-emitting element disposed on the second side plate;

wherein near-infrared light emitted by the first light-emitting element intersects with near-infrared light emitted by the second light-emitting element to form an effective working region; the controller is configured to control the near-infrared light-emitting element to emit near-infrared light when the controller determines that the user is located in the effective working region.

10. The display device of claim 1, wherein the near-infrared light has a wavelength of 900 nm to 1800 nm.

11. An electronic device, comprising:

a display device comprising a backlight module and a display panel which are stacked, the backlight module comprising:

a back plate comprising a bottom plate and a plurality of side plates, wherein the plurality of side plates encircle and are connected to the bottom plate to form a receiving space;

at least one near-infrared light-emitting element disposed in the receiving space, wherein each of the at least one near-infrared light-emitting element is disposed corresponding to one of the plurality of side plates, the near-infrared light-emitting element is inclined relative to the display panel, and the near-infrared light-emitting element is configured to emit near-infrared light, wherein the near-infrared light can heat the skin of a user; and at least one diffuser, wherein the diffuser is disposed corresponding to a light-exiting surface of the near-infrared light-emitting element and configured to diffuse the near-infrared light emitted by the near-infrared light-emitting element; and a power-supply device electrically connected to the display device and configured to provide power for the display device.

12. The electronic device of claim 11, wherein the near-infrared light-emitting element comprises a lamp plate and a plurality of near-infrared light lamp beads disposed on the lamp plate; and the diffuser is a convex diffusion lens, wherein the convex diffusion lens is connected to the lamp plate, covers the near-infrared light lamp beads, and protrudes towards the display panel.

13. The electronic device of claim 11, wherein the backlight module further comprises an optical film layer, wherein the optical film layer is disposed on the side plate and disposed between the near-infrared light-emitting element and the display panel, and the optical film layer is configured to homogenize the near-infrared light emitted by the near-infrared light-emitting element.

14. The electronic device of claim 11, wherein the side plate has a mounting surface for mounting the near-infrared light-emitting element, and an angle a between the mounting surface and a side of the bottom plate away from the receiving space satisfies: $30° \leq a \leq 70°$.

15. The electronic device of claim 14, wherein the mounting surface defines a mounting groove, and the mounting groove is used for mounting the near-infrared light-emitting element.

16. The electronic device of claim 12, wherein the at least one near-infrared light-emitting element comprises a plurality of near-infrared light-emitting elements, and each of the plurality of near-infrared light-emitting elements is disposed corresponding to one side plate; for two near-infrared light-emitting elements disposed opposite to each other, in a direction from one of the two near-infrared light-emitting elements towards the other one of the two near-infrared light-emitting elements, a plurality of near-infrared light lamp beads in the one of the two near-infrared light-emitting elements and a plurality of near-infrared light lamp beads in the other one of the two near-infrared light-emitting elements are disposed in a staggered manner or disposed opposite to one another.

17. The electronic device of claim 16, wherein the plurality of side plates comprise a first side plate, a second side plate, a third side plate, and a fourth side plate which are sequentially connected in a bent manner, wherein the first side plate has a length equal to the third side plate, and the first side plate is opposite to and spaced apart from the third side plate; the second side plate has a length equal to the fourth side plate, and the second side plate is opposite to and spaced apart from the fourth side plate; the first side plate and the third side plate each have a length greater than the second side plate and the fourth side plate;

a plurality of near-infrared light lamp beads on the first side plate and a plurality of near-infrared light lamp beads on the third side plate are disposed in a staggered manner; and a plurality of near-infrared light lamp beads on the second side plate are disposed opposite to a plurality of near-infrared light lamp beads on the fourth side plate.

18. The electronic device of claim 11, wherein the display device further comprises:

at least one distance detector configured to detect an actual distance between the user and the display device; and a controller electrically connected to the distance detector and the near-infrared light-emitting element, and configured to control the near-infrared light-emitting element to emit near-infrared light when the controller determines that the actual distance is less than a maximum of a preset range.

19. The electronic device of claim 18, wherein the plurality of side plates comprise a first side plate and a second side plate which are disposed opposite to each other, and the at least one near-infrared light-emitting element comprises a first light-emitting element disposed on the first side plate and a second light-emitting element disposed on the second side plate;

wherein near-infrared light emitted by the first light-emitting element intersects with near-infrared light emitted by the second light-emitting element to form an effective working region; the controller is configured to control the near-infrared light-emitting element to emit near-infrared light when the controller determines that the user is located in the effective working region.

20. The electronic device of claim 11, wherein the near-infrared light has a wavelength of 900 nm to 1800 nm.

* * * * *